United States Patent
Chang et al.

(10) Patent No.: US 9,921,671 B2
(45) Date of Patent: Mar. 20, 2018

(54) TOUCH PROJECTION SCREEN AND MANUFACTURING METHOD THEREOF

(71) Applicant: Coretronic Corporation, Hsin-Chu (TW)

(72) Inventors: Kun-Rong Chang, Hsin-Chu (TW);
Nan-Jiun Yin, Hsin-Chu (TW);
Pen-Ning Kuo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 196 days.

(21) Appl. No.: 14/819,409

(22) Filed: Aug. 5, 2015

(65) Prior Publication Data

US 2016/0216789 A1    Jul. 28, 2016

(30) Foreign Application Priority Data

Jan. 28, 2015  (CN) .......................... 2015 1 0042595

(51) Int. Cl.
*G06F 3/041* (2006.01)

(52) U.S. Cl.
CPC .... *G06F 3/041* (2013.01); *G06F 2203/04102* (2013.01); *G06F 2203/04103* (2013.01)

(58) Field of Classification Search
CPC ........... G06F 3/041; G06F 2203/04103; G06F 2203/04102

See application file for complete search history.

(56) References Cited

U.S. PATENT DOCUMENTS

| | | | |
|---|---|---|---|
| 2005/0243239 A1 | 11/2005 | Kondo et al. | |
| 2007/0139397 A1 | 6/2007 | Cross | |
| 2008/0223708 A1 | 9/2008 | Joo | |
| 2011/0084935 A1 | 4/2011 | Cheng | |
| 2011/0304571 A1* | 12/2011 | Kim | G02F 1/13338 345/173 |
| 2012/0035934 A1* | 2/2012 | Cunningham | G06F 1/1639 704/260 |
| 2013/0038548 A1* | 2/2013 | Kitada | G06F 3/041 345/173 |
| 2013/0279152 A1* | 10/2013 | Lee | G06F 3/041 362/97.1 |

(Continued)

FOREIGN PATENT DOCUMENTS

| | | |
|---|---|---|
| CN | 1361471 | 7/2002 |
| CN | 202171790 | 3/2012 |

(Continued)

*Primary Examiner* — Aneeta Yodichkas
(74) *Attorney, Agent, or Firm* — JCIPRNET

(57) ABSTRACT

A touch projection screen including a first substrate, a plurality of first touch layers, a plurality of second touch layers, and a reflective projection film is provided. The first touch layers are disposed on the first substrate and at least two of the first touch layers are arranged adjacent to each other. Each of the first touch layers includes a first base layer and a first patterned electrode disposed on the first base layer. The second touch layers are disposed on the first touch layers and at least two of the second touch layers are arranged adjacent to each other. Each of the second touch layers includes a second base layer and a second patterned electrode disposed on the second base layer. The reflective projection film is disposed on the second touch layers. A manufacturing method of the touch projection screen is also provided.

21 Claims, 7 Drawing Sheets

(56) References Cited

U.S. PATENT DOCUMENTS

| | | | | |
|---|---|---|---|---|
| 2014/0009443 A1* | 1/2014 | Hung | ................... | G06F 3/0425 |
| | | | | 345/175 |
| 2014/0092041 A1 | 4/2014 | Ih | | |
| 2014/0347295 A1* | 11/2014 | Kim | ....................... | G06F 1/163 |
| | | | | 345/173 |
| 2015/0122623 A1 | 5/2015 | Kim et al. | | |
| 2015/0155505 A1 | 6/2015 | Yamazaki et al. | | |
| 2015/0185887 A1* | 7/2015 | Park | .................. | H05K 13/0469 |
| | | | | 345/173 |

FOREIGN PATENT DOCUMENTS

| | | |
|---|---|---|
| CN | 102646001 | 8/2012 |
| CN | 103376934 | 10/2013 |
| CN | 103384866 | 11/2013 |
| CN | 103577018 | 2/2014 |
| CN | 103729083 | 4/2014 |
| JP | 2003005617 | 1/2003 |
| JP | 2012073360 | 4/2012 |
| TW | M339050 | 8/2008 |
| TW | I423096 | 1/2014 |
| TW | M470320 | 1/2014 |

\* cited by examiner

TOUCH PROJECTION SCREEN AND MANUFACTURING METHOD THEREOF

CROSS-REFERENCE TO RELATED APPLICATION

This application claims the priority benefit of China application serial no. 201510042595.1, filed on Jan. 28, 2015. The entirety of the above-mentioned patent application is hereby incorporated by reference herein and made a part of this specification.

BACKGROUND

Technical Field

The invention relates to a projection screen, and particularly relates to a touch projection screen.

Related Art

As electronic devices are developed towards a trend of multifunction, the conventional button-type operation interfaces are gradually unable to meet the needs of the users. In this case, the touch technology is rapidly developed. Compared with the conventional button-type operation interface, the operation of a touch operation interface is more simple and intuitive, and the user could directly perform a touch input on a display surface of an electronic device through a finger or a stylus. Besides being applied to the display surface of the electronic device, the touch technology could also be applied to a projection screen on which images are projected by a projection apparatus, such that the user could perform a touch input through the projection screen.

A capacitive touch technology is a main technique applied to the current touch operation interface, and a touch layer of the touch operation interface is generally composed of a substrate and a transparent conductive material on the substrate such as an indium tin oxide (ITO) electrode. The touch layer including the ITO electrode cannot be applied to a large-size touch operation interface due to limitation of a manufacturing technique and manufacturing cost. Moreover, the touch layer applied to the display surface of the electronic device has to have a high light transmittance to avoid an adverse effect on display quality of the electronic device, which increases manufacturing difficulty and the difficulty of selecting materials for the touch layer. Moreover, in order to increase a touch sensing area of the touch layer, some of the touch layers are designed to have electrode lines composed of a plurality of diamond-shape electrodes connected to each other, such design may greatly increase time required for an etching process of the electrode and greatly increase a usage amount of the conductive material to cause a high manufacturing cost. In addition, because the conventional touch operation interface is generally composed of one single touch layer, flexible applications through arrangement of a plurality of touch layers cannot be achieved.

China Patent Application Publication No. CN103383617A discloses a method for manufacturing a flexible transparent touch membrane, by which a conductive silver paste is printed according to a positioning mark to form an edge wire of the transparent touch membrane, and the transparent touch membrane could be applied to an interactive projection system. China Patent Application Publication No. CN103984457A discloses a capacitive touch screen, in which electrode patterns are formed through screen printing and an etching process. Taiwan Patent No. TWI407338B discloses a touch panel, in which a driving layer has a plurality of alignment marks, and according to the alignment marks, an exposure machine could implement accurate alignment to form transparent conductive patterns. China Patent Application Publication No. CN104007885A discloses a projected capacitive touch whiteboard, which has a protection layer for protecting an electrode layer. China Patent Application Publication No. CN103440070A discloses a manufacturing process of a touch screen, by which a nano silver paste is printed on a substrate to fabricate a line grid through screen printing. U.S. Patent Application Publication No. US20100028811A1 discloses a touch panel, in which electrodes thereof are constructed by a plurality of electrode lines arranged in intervals and in parallel. U.S. Patent Application Publication No. US20120169401A1 discloses a touch panel, in which screen regions are divided through distribution of electrode patterns.

The information disclosed in this "BACKGROUND" section is only for enhancement understanding of the background of the invention and therefore it may contain information that does not form the prior art that is already known to a person of ordinary skill in the art. Furthermore, the information disclosed in this "BACKGROUND" section does not mean that one or more problems to be solved by one or more embodiments of the invention were acknowledged by a person of ordinary skill in the art.

SUMMARY

The invention is directed to a touch projection screen, which is adapted to a large-size touch operation interface, and may have a low manufacturing difficulty and manufacturing cost.

Other objects and advantages of the invention could be further illustrated by the technical features broadly embodied and described as follows.

In order to achieve one or a portion of or all of the objects or other objects, an embodiment of the invention provides a touch projection screen including a first substrate, a plurality of first touch layers, a plurality of second touch layers, and a reflective projection film. The first touch layers are disposed on the first substrate. At least two of the first touch layers are arranged adjacent to each other. Each of the first touch layers includes a first base layer and a first patterned electrode, where the first patterned electrode is disposed on the first base layer. The second touch layers are disposed on the first touch layers. At least two of the second touch layers are arranged adjacent to each other. Each of the second touch layers includes a second base layer and a second patterned electrode, where the second patterned electrode is disposed on the second base layer. The reflective projection film is disposed on the second touch layers.

In an embodiment of the invention, each of the first touch layers is partially overlapped to one of the second touch layers, and is partially overlapped to another one of the second touch layers.

In an embodiment of the invention, each of the second touch layers is partially overlapped with one of the first touch layers, and is partially overlapped with another one of the first touch layers.

In an embodiment of the invention, the touch projection screen includes a first adhesive layer, a second adhesive layer, and a third adhesive layer, where the first touch layers are adhered to the first substrate through the first adhesive layer, the second touch layers are adhered to the first touch layers through the second adhesive layer, and the reflective projection film is adhered to the second touch layers through the third adhesive layer.

In an embodiment of the invention, the touch projection screen further includes a second substrate, where the second substrate is disposed between the second touch layers and the reflective projection film.

In an embodiment of the invention, the touch projection screen includes a first adhesive layer, a second adhesive layer, a third adhesive layer, and a fourth adhesive layer, where the first touch layers are adhered to the first substrate through the first adhesive layer, the second touch layers are adhered to the first touch layers through the second adhesive layer, the second substrate is adhered to the second touch layers through the third adhesive layer, and the reflective projection film is adhered to the second substrate through the fourth adhesive layer.

In an embodiment of the invention, the touch projection screen is a flexible structure.

In an embodiment of the invention, the second base layer is located between at least one first patterned electrode and at least one second patterned electrode.

In an embodiment of the invention, each of the first patterned electrodes includes a plurality of first electrode line groups and a plurality of first collection lines, the first electrode line groups are arranged in intervals and arranged in parallel, and are respectively connected to a control unit through the first collection lines.

In an embodiment of the invention, each of the first electrode line groups includes a plurality of first electrode lines, and the first electrode lines are arranged in intervals and arranged in parallel and are collected to the corresponding first collection line.

In an embodiment of the invention, each of the first electrode line groups includes at least two first sub collection lines, a part of the first electrode lines are collected to one of the first sub collection lines, another part of the first electrode lines are collected to another one of the first sub collection lines, and the at least two first sub collection lines are collected to the first collection line.

In an embodiment of the invention, each of the second patterned electrodes includes a plurality of second electrode line groups and a plurality of second collection lines, the second electrode line groups are arranged in intervals and arranged in parallel, and are respectively connected to a control unit through the second collection lines.

In an embodiment of the invention, each of the second electrode line groups includes a plurality of second electrode lines, and the second electrode lines arranged in intervals and arranged in parallel and are collected to the corresponding second collection line.

In an embodiment of the invention, each of the second electrode line groups includes at least two second sub collection lines, a part of the second electrode lines are collected to one of the second sub collection lines, another part of the second electrode lines are collected to another one of the second sub collection lines, and the at least two second sub collection lines are collected to the second collection line.

In an embodiment of the invention, each of the first patterned electrodes includes a plurality of first electrode line groups, each of the second patterned electrodes includes a plurality of second electrode line groups, and an extending direction of each of the first electrode line groups is perpendicular to an extending direction of each of the second electrode line groups.

In an embodiment of the invention, areas of at least two first touch layers are different to each other.

In an embodiment of the invention, areas of at least two second touch layers are different to each other.

In an embodiment of the invention, an area of at least one of the first touch layers is different to an area of at least one of the second touch layers.

In an embodiment of the invention, each of the first base layers has a plurality of first alignment points, each of the second base layers has a plurality of second alignment points, at least a part of the second alignment points on each of the second base layers are aligned to at least a part of the first alignment points on at least one of the first base layers.

In an embodiment of the invention, the touch projection screen includes an outer frame, where the outer frame encircles the first substrate, the first touch layers, the second touch layers, and the reflective projection film.

In order to achieve one or a portion of or all of the objects or other objects, an embodiment of the invention provides a method of manufacturing a touch projection screen, which includes following steps. A first substrate is provided. Multiple first touch layers are provided. The first touch layers are disposed on the first substrate, wherein at least two of the first touch layers are arranged adjacent to each other, each of the first touch layers includes a first base layer and a first patterned electrode, and the first patterned electrode is disposed on the first base layer. Multiple second touch layers are provided. The second touch layers are disposed on the first touch layers, wherein at least two of the second touch layers are arranged adjacent to each other, each of the second touch layers includes a second base layer and a second patterned electrode, and the second patterned electrode is disposed on the second base layer. A reflective projection film is provided. The reflective projection film is disposed on the second touch layers.

In an embodiment of the invention, the step of providing the first touch layers includes coating the first patterned electrode on the corresponding first base layer through screen printing for each of the first touch layers.

In an embodiment of the invention, the step of providing the second touch layers includes coating the second patterned electrode on the corresponding second base layer through screen printing for each of the second touch layers.

In an embodiment of the invention, the step of disposing the second touch layers on the first touch layers includes following steps. Each of the first touch layers is partially overlapped with one of the second touch layers, and is partially overlapped with another one of the second touch layers. Each of the second touch layers is partially overlapped with one of the first touch layers, and is partially overlapped with another one of the first touch layers.

In an embodiment of the invention, the manufacturing method of the touch projection screen further includes following steps. A first adhesive layer is provided, and the first touch layers are adhered to the first substrate through the first adhesive layer. A second adhesive layer is provided, and the second touch layers are adhered to the first touch layers through the second adhesive layer. A third adhesive layer is provided, and the reflective projection film is adhered to the second touch layers through the third adhesive layer.

In an embodiment of the invention, the manufacturing method of the touch projection screen further includes providing a second substrate, where the second substrate is disposed between the second touch layers and the reflective projection film.

In an embodiment of the invention, the manufacturing method of the touch projection screen further includes following steps. A first adhesive layer is provided, and the first touch layers are adhered to the first substrate through the first adhesive layer. A second adhesive layer is provided, and the second touch layers are adhered to the first touch layers through the second adhesive layer. A third adhesive layer is provided, and the second substrate is adhered to the second touch layers through the third adhesive layer. A fourth adhesive layer is provided, and the reflective projection film is adhered to the second substrate through the fourth adhesive layer.

In an embodiment of the invention, the step of disposing the second touch layers on the first touch layers includes making the second base layers to be located between the first patterned electrodes and the second patterned electrodes.

In an embodiment of the invention, the step of providing the first touch layers includes forming the first patterned electrode on the first base layer for each of the first touch layer, and wherein the step of forming the first patterned electrode includes forming a plurality of first electrode line groups and a plurality of first collection lines on the first base layer, wherein the first electrode line groups are arranged in intervals and arranged in parallel, and are respectively connected to an external electronic device through the first collection lines.

In an embodiment of the invention, the step of forming the first electrode line groups includes forming a plurality of first electrode lines of each of the first electrode line groups on the first base layer, where the first electrode lines are arranged in intervals and arranged in parallel and are collected to the corresponding first collection line.

In an embodiment of the invention, the step of forming the first electrode line groups includes forming at least two first sub collection lines of each of the first electrode line groups on the first base layer, where a part of the first electrode lines are collected to one of the first sub collection lines, another part of the first electrode lines are collected to the other one of the first sub collection lines, and the at least two first sub collection lines are collected to the first collection line.

In an embodiment of the invention, the step of providing the second touch layers includes forming the second patterned electrode on the second base layer for each of the second touch layer, and wherein the step of forming the second patterned electrode includes forming a plurality of second electrode line groups and a plurality of second collection lines on the second base layer, where the second electrode line groups are arranged in intervals and arranged in parallel, and are respectively connected to an external electronic device through the second collection lines.

In an embodiment of the invention, the step of forming the second electrode line groups includes forming a plurality of second electrode lines of each of the second electrode line groups on the second base layer, wherein the second electrode lines are arranged in intervals and arranged in parallel and are collected to the corresponding second collection line.

In an embodiment of the invention, the step of forming the second electrode line groups includes forming at least two second sub collection lines of each of the second electrode line groups on the second base layer, wherein a part of the second electrode lines are collected to one of the second sub collection lines, another part of the second electrode lines are collected to the other one of the second sub collection lines, and the at least two second sub collection lines are collected to the second collection line.

In an embodiment of the invention, each of the first patterned electrodes includes a plurality of first electrode line groups, each of the second patterned electrodes includes a plurality of second electrode line groups, and the step of disposing the second touch layers on the first touch layers includes making an extending direction of each of the first electrode line groups to be perpendicular to an extending direction of each of the second electrode line groups.

In an embodiment of the invention, the step of providing the first touch layers includes forming a plurality of first alignment points on each of the first base layers, and the step of providing the second touch layers includes forming a plurality of second alignment points on each of the second base layers.

In an embodiment of the invention, the step of disposing the second touch layers on the first touch layer includes aligning at least a part of the second alignment points on each of the second base layers to at least a part of the first alignment points on at least one of the first base layers.

In an embodiment of the invention, the method of manufacturing the touch projection screen further includes providing an outer frame, and encircling the first substrate, the first touch layers, the second touch layers and the reflective projection film by the outer frame.

In order to achieve one or a portion of or all of the objects or other objects, an embodiment of the invention provides a projection system including a touch projection screen and a projection apparatus. The touch projection screen includes a first substrate, a plurality of first touch layers, a plurality of second touch layers, and a reflective projection film. The first touch layers are disposed on the first substrate. At least two of the first touch layers are arranged adjacent to each other. Each of the first touch layers includes a first base layer and a first patterned electrode, where the first patterned electrode is disposed on the first base layer. The second touch layers are disposed on the first touch layers. At least two of the second touch layers are arranged adjacent to each other. Each of the second touch layers includes a second base layer and a second patterned electrode, where the second patterned electrode is disposed on the second base layer. The reflective projection film is disposed on the second touch layers. The projection apparatus is adapted to project an image beam on the touch projection screen, where the reflective projection film is configured to reflect the image beam to a viewing area.

The embodiments of the invention have at least one of the following advantages. A plurality of first touch layers are arranged adjacent to each other, a plurality of second touch layers are arranged adjacent to each other, and the second touch layers are disposed on the first touch layers to construct a touch sensing layer with a larger size, so as to fit a large-size touch operation interface (for example, the touch projection screen). Because the touch layers of the invention can be applied to the touch projection screen other than being applied to a touch display panel of an electronic device, the touch layers may be unnecessary to have a high light transmittance, and manufacturing difficulty thereof can be decreased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
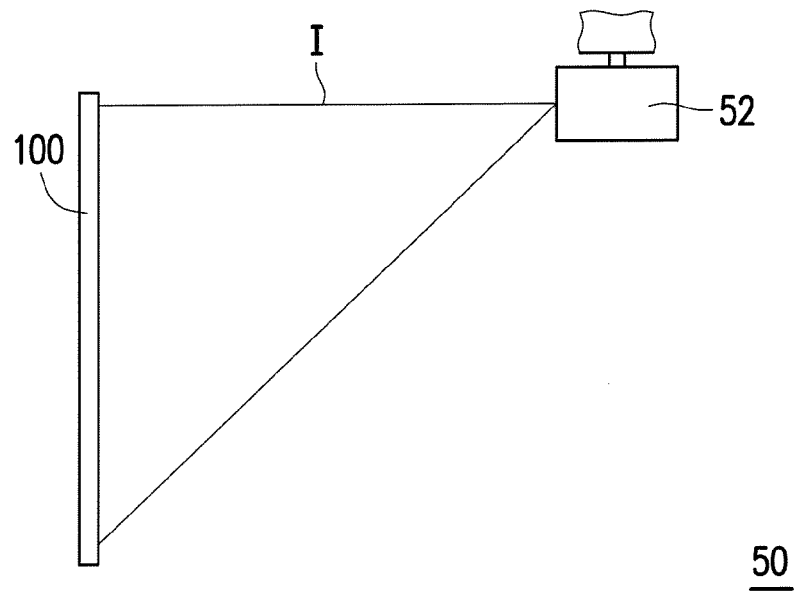
FIG. 1 is a schematic diagram of a projection system according to an embodiment of the invention.

FIG. 1 is a schematic diagram of a projection system according to an embodiment of the invention. Referring to FIG. 1, the projection system 50 of the embodiment includes a touch projection screen 100 and a projection apparatus 52. The touch projection screen 100 is, for example, a capacitive touch projection screen. The projection apparatus 52 is, for example, a projector used for projecting an image beam I to the touch projection screen 100 for forming images for a user to watch, and the user could perform a touch operation on the touch projection screen 100.

Figure 2:
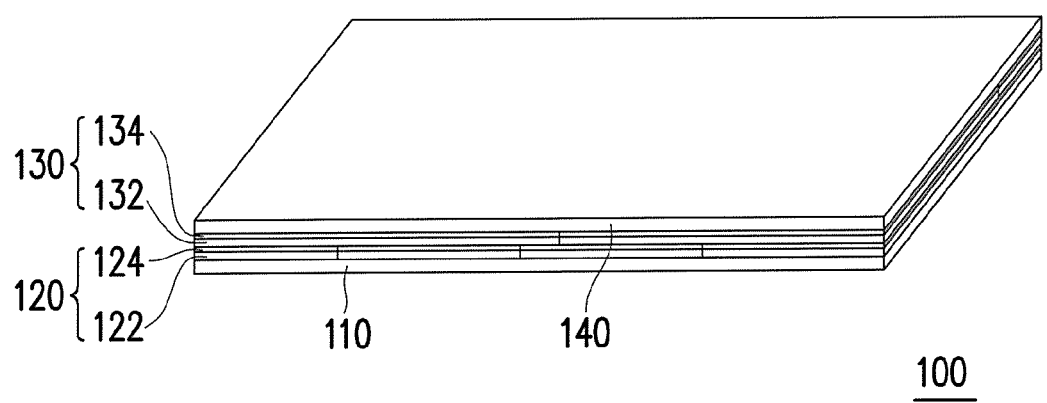
FIG. 2 is a schematic three-dimensional view of the touch projection screen of FIG. 1.
Figure 3:
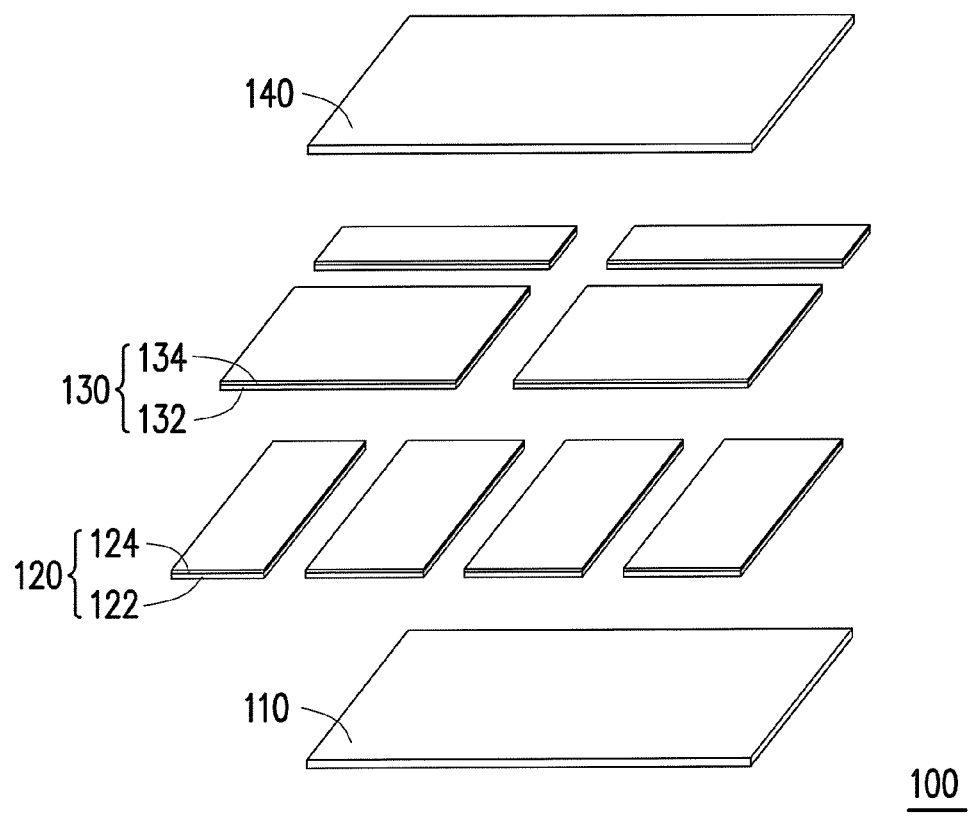
FIG. 3 is an schematic exploded view of the touch projection screen of FIG. 2.

FIG. 2 is a schematic three-dimensional view of the touch projection screen of FIG. 1. FIG. 3 is an schematic exploded view of the touch projection screen of FIG. 2. Referring to FIG. 2 and FIG. 3, the touch projection screen 100 includes a first substrate 110, a plurality of first touch layers 120, a plurality of second touch layers 130, and a reflective projection film 140. The first touch layers 120 are disposed on the first substrate 110 and at least two of the first touch layers 120 are arranged adjacent to each other. Each of the first touch layers 120 includes a first base layer 122 and a first patterned electrode 124, where the first patterned electrode 124 is disposed on the first base layer 122. The second touch layers 130 are disposed on the first touch layers 120 and at least two of the second touch layers 130 are arranged adjacent to each other. Each of the second touch layers 130 includes a second base layer 132 and a second patterned electrode 134, where the second patterned electrode 134 is disposed on the second base layer 134. The reflective projection film 140 is disposed on the second touch layers 130, and is used for reflecting the image beam I shown in FIG. 1 to a viewing area of the user for the user to watch.

In the aforementioned configuration, the first touch layers 120 are arranged adjacent to each other, the second touch layers 130 are arranged adjacent to each other, and the second touch layers 130 are stacked on the first touch layers 120 to construct a touch sensing layer with a larger size suitable for a touch operation interface (for example, the touch projection screen) of a large size. Moreover, since the touch layers of the invention are suitable for being applied to the touch projection screen other than a touch display panel of an electronic device, the touch layers may be unnecessary to have a high light transmittance, and manufacturing difficulty thereof is decreased. It should be noted that although the embodiments of the invention may be suitable for a large size projection screen, the invention is not limited thereto. In other words, the invention is not limited to a specific size.

In the embodiment, the touch projection screen 100 can be, for example, adhered to an acrylic plate, a glass plate, a wall or other suitable fixing ends. However, the invention is not limited thereto, and the first substrate 110, the first base layer 122, the second base layer 132, and the reflective projection film 140 could be flexible structures such that the touch projection screen 100 can be rolled up. In one embodiment, a material of the first substrate 110, the first base layer 122, and the second base layer 132 is, for example, polyethylene terephthalate (PET), the reflective projection film 140 is, for example, a white plastic film layer suitable for reflecting lights, and a material of the first patterned electrode 124 and the second patterned electrode 134 is, for example, silver paste, though the invention is not limited thereto, and the material of the first substrate 110, the first base layer 122, and the second base layer 132 may be other suitable flexible non-conductive materials, the reflective projection film 140 could be made of other opaque non-conductive materials, and the first patterned electrode 124 and the second patterned electrode 134 may be other suitable conductive materials.

In the embodiment, as shown in FIG. 2, the second base layers 132 are located between the first patterned electrodes 124 and the second patterned electrodes 134, so as to avoid unexpected electrical connection between the first patterned electrodes 124 and the second patterned electrodes 134.

Figure 4:
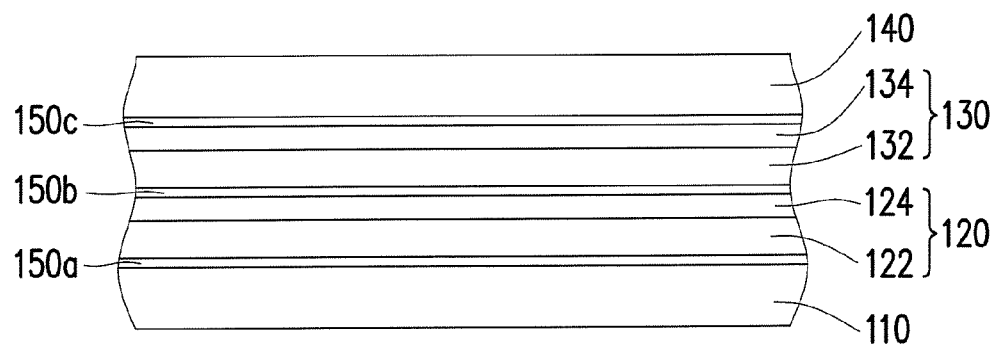
FIG. 4 is a schematic partial side view of the touch projection screen of FIG. 2.

FIG. 4 is a schematic partial side view of the touch projection screen of FIG. 2. Referring to FIG. 4, in the embodiment, the touch projection screen 100 further includes a first adhesive layer 150a, a second adhesive layer 150b, and a third adhesive layer 150c. The first touch layers 120 are adhere to the first substrate 110 through the first adhesive layer 150a, the second touch layers 130 are adhered to the first touch layers 120 through the second adhesive layer 150b, and the reflective projection film 140 is adhered to the second touch layers 130 through the third adhesive layer 150c. Since the touch layers are not required to have a high light transmittance, the first adhesive layer 150a, the second adhesive layer 150b, and the third adhesive layer 150c may be unnecessary to adopt an expensive optical adhesive, therefore a manufacturing cost can be reduced.

Figure 5:
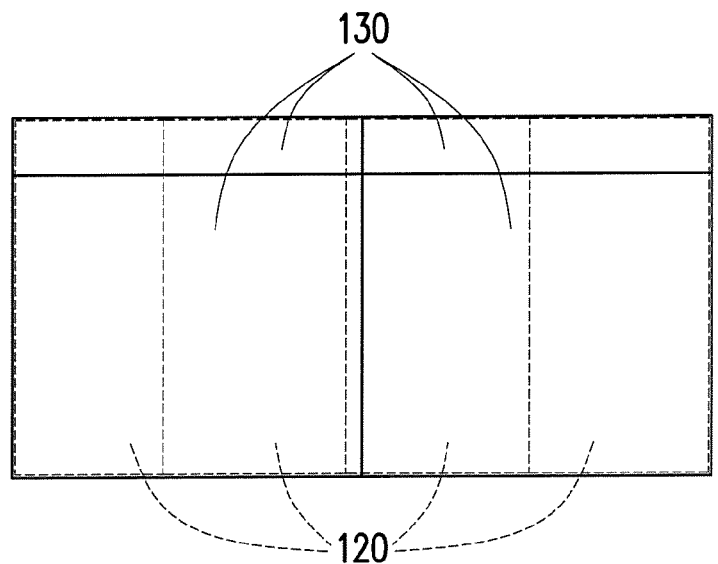
FIG. 5 is a schematic top view of a first touch layer and a second touch layer of FIG. 2.

FIG. 5 is a schematic top view of the first touch layer and the second touch layer of FIG. 2. For clarity's sake, the second touch layers 130 are drawn by solid lines, and the first touch layers 120 are drawn by dot lines. Referring to FIG. 3 and FIG. 5, in one embodiment, each of the first touch layers 120 is partially overlapped to one of the second touch layers 130, and is partially overlapped to at least another one of the second touch layers 130. Each of the second touch layers 130 is partially overlapped to one of the first touch layers 120, and is partially overlapped to at least another one of the first touch layers 120. In this way, the first touch layers 120 and the second touch layers 130 are stably adhered together in interleave through the second adhesive layer 150b of FIG. 4. A diagonal length of the touch layers shown in FIG. 5 is, for example, but not limited to, 135 inches, such that the touch projection screen of FIG. 1 has a touch operation interface of 135 inches. It should be noticed that each of the first touch layers 120 of FIG. 5 is only exemplarily overlapped to two pieces of the second touch layers 130, and a part of the second touch layers 130 could be overlapped to three pieces of the first touch layers 120, though the invention is not limited thereto. In one embodiment, each of the first touch layers 120 could be designed to overlap with more than three pieces of the second touch layers 130, and each of the second touch layers 130 could be designed to overlap with two pieces of the first touch layers 120 or with more than three pieces of the first touch layers 120, so as to correspond to the touch projection screen of different sizes.

As shown in FIG. 3 and FIG. 5, in the embodiment, a sum of areas of the first touch layers 120 is, for example, equal to a sum of areas of the second touch layers, such that the first touch layers 120 and the second touch layers 130 are completely overlapped. In one embodiment, the areas of at least two first touch layers 120 are different to each other, the areas of at least two second touch layers 130 are different to each other, and the area of at least one first touch layer 120 is different to the area of at least one second touch layer 130. In other embodiments, the first touch layers 120 and the second touch layers 130 could be have other suitable sizes, and the invention is not limited thereto. In other embodiments, the sum of the areas of the first touch layers 120 could be different to the sum of the areas of the second touch layers 130, and the first touch layers 120 and the second touch layers 130 may have other suitable numbers, and the invention is not limited thereto.

Each of the first patterned electrodes 124 and each of the second patterned electrodes 134 shown in FIG. 2 and FIG. 3 are schematic, and each of the first patterned electrodes 124 and each of the second patterned electrodes 134 are substantially patterned electrode layer structures, and are used for sensing a touch input of the user. A detailed structure of each of the first patterned electrodes 124 and each of the second patterned electrodes 134 is as follows.

Figure 6:
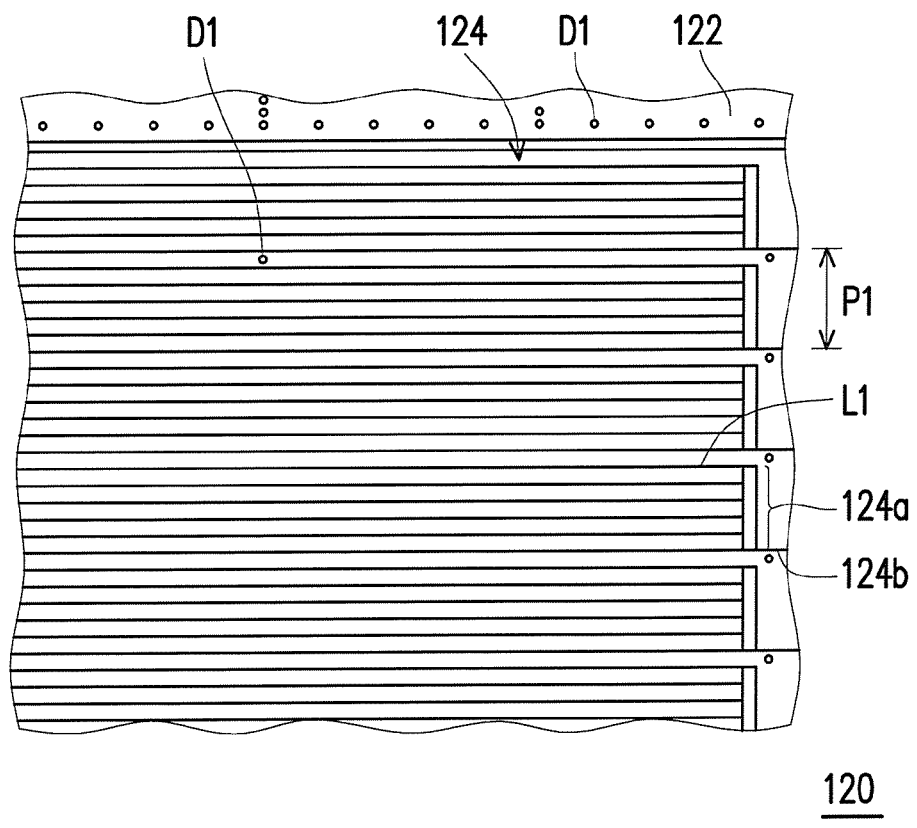
FIG. 6 is a schematic partial top view of a first touch layer of FIG. 2.
Figure 7:
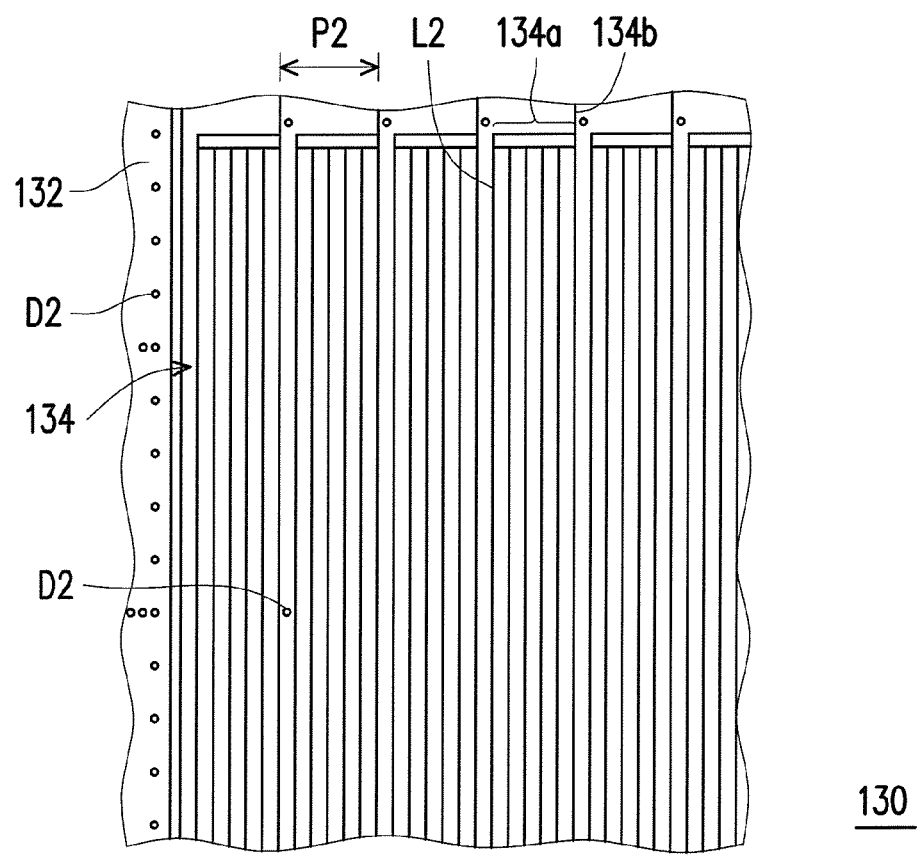
FIG. 7 is a schematic partial top view of a second touch layer of FIG. 2.

FIG. 6 is a schematic partial top view of the first touch layer 120 of FIG. 2. FIG. 7 is a schematic partial top view of the second touch layer 130 of FIG. 2. Referring to FIG. 6 and FIG. 7, each of the first patterned electrodes 124 of the embodiment is, for example, an emitting electrode and includes a plurality of first electrode line groups 124a and a plurality of first collection lines 124b. The first electrode line groups 124a are arranged in intervals and arranged in parallel, and are respectively connected to a control unit of the touch projection screen 100 through the first collection lines 124b. Similarly, each of the second patterned electrodes 134 is, for example, a receiving electrode and includes a plurality of second electrode line groups 134a and a plurality of second collection lines 134b. The second electrode line groups 134a are arranged in intervals and arranged in parallel, and are respectively connected to the control unit of the touch projection screen 100 through the second collection lines 134b. An extending direction of each of the first electrode line groups 124a is, for example, perpendicular to an extending direction of each of the second electrode line groups 134a.

Referring to FIG. 6, each of the first electrode line groups 124a includes a plurality of first electrode lines L1 (six first electrode lines are exemplarily illustrated in FIG. 6), and the first electrode lines L1 are arranged in intervals and arranged in parallel and are collected to the corresponding first collection line 124b. Similarly, referring to FIG. 7, each of the second electrode line groups 134a includes a plurality of second electrode lines L2 (six second electrode lines are exemplarily illustrated), and the second electrode lines L2 arranged in intervals and arranged in parallel and are collected to the corresponding second collection line 134b.

In this way, by constructing each of the first electrode line groups 124a through a plurality of the first electrode lines L1 parallel to each other and constructing each of the second electrode line groups 134a through a plurality of the second electrode lines L2 parallel to each other, the first patterned electrode 124 formed by the first electrode line groups 124a may have a large touch area, and the second patterned electrode 134 formed by the second electrode line groups 134a may have a large touch area. Since the first electrode line L1 and the second electrode line L2 are respectively a linear structure other than a planar structure, time required for an etching process of the electrodes is not excessively increased, and a usage amount of the conductive material can be decreased so as to save the manufacturing cost.

In one embodiment, a line width of each of the first electrode lines L1 and each of the second electrode lines L2 is, for example, 0.15 mm, an interval between two adjacent first electrode lines L1 and an interval between two adjacent second electrode lines L2 are, for example, 1.35 mm, and an interval between two adjacent first electrode line groups 124a and an interval between two adjacent second electrode line groups 134a are, for example, 1.35 mm. In this way, a pitch P1 of the first electrode line groups 124a and a pitch P2 of the second electrode line groups 134a are 9 mm, which is approximately equal to a width of a fingertip of an adult, so as to achieve a good touch sensing effect.

In one embodiment, the first touch layers 120 shown in FIG. 3 are, for example, precisely disposed on the first substrate 110 through an alignment fixture, and the second touch layers 130 are, for example, precisely disposed on the first touch layers 120 through alignment points on each of the first touch layers 120 and alignment points on each of the second touch layers 130. As shown in FIG. 6 and FIG. 7, each of the first base layers 122 has a plurality of first alignment points D1, and each of the second base layers 132 has a plurality of second alignment points D2. At least a part of the second alignment points D2 on each of the second base layers 132 are aligned to at least a part of the first alignment points D1 on at least one first base layer 122. Positions of the first alignment points D1 and the second alignment points D2 are not limited. In one embodiment, the first alignment points D1 could be formed at a peripheral region and/or an interior region of the first patterned electrode 124 according to a process requirement, and the second alignment points D2 could be formed at a peripheral region and/or an interior region of the second patterned electrode 134 according to a process requirement, where the first alignment points D1 formed at the interior region of the first patterned electrode 124 are, for example, located between two adjacent first electrode lines L1, and the second alignment points D2 formed at the interior region of the second patterned electrode 134 are, for example, located between two adjacent second electrode lines L2. In this way, when a length of the first touch layer 120 and the second touch layer 130 is relatively long, the first alignment points D1 in the interior region of the first patterned electrode 124 and the second alignment points D2 in the interior region of the second patterned electrode 134 may improve alignment accuracy of the first touch layer 120 and the second touch layer 130. In one embodiment, the aforementioned alignment fixture, for example, may have a plurality of alignment marks. When the first touch layer 120 is to be disposed on the first substrate 110, the first alignment points D1 in the peripheral region of the first patterned electrode 124 could be aligned to the alignment marks, though the invention is not limited thereto.

In one embodiment, the first patterned electrode 124 is, for example, coated on the first base layer 122 through screen printing, and the first alignment points D1 are, for example, made of a material same with that of the first patterned electrode 124 and are coated on the first base layer 122 through the same screen printing method. Similarly, the second patterned electrode 134 is, for example, made of a material same with that of the first patterned electrode 124 and is coated on the second base layer 132 through screen printing, and the second alignment points D2 are coated on the second base layer 132 through the same screen printing method. In one embodiment, a screen printer with a size of 65 inches or 84 inches may be, for example, used to print the first patterned electrode 124 on each of the first base layers 122 and print the second patterned electrode 134 on each of the second base layers 132, though the invention is not limited to the size of the screen printer. In other embodiments, the first patterned electrode 124, the second patterned electrode 134, the first alignment points D1, and the second alignment points D2 could be formed through other suitable manufacturing processes, and the first alignment points D1 and the second alignment points D2 could be made of other suitable materials, which is not limited by the invention.

Figure 8:
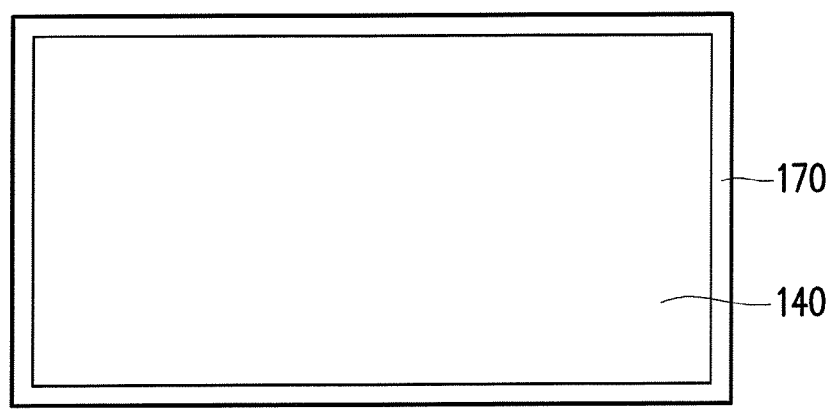
FIG. 8 is a schematic top view of the touch projection screen of FIG. 2.

FIG. 8 is a schematic top view of the touch projection screen of FIG. 2. As shown in FIG. 8, the touch projection screen 100 further includes an outer frame 170, where the outer frame 170 encircles the first substrate 110, the first touch layers 120, the second touch layers 130, and the reflective projection film 140 shown in FIG. 2, such that the structure of the touch projection screen 100 is more stable.

Figure 9:
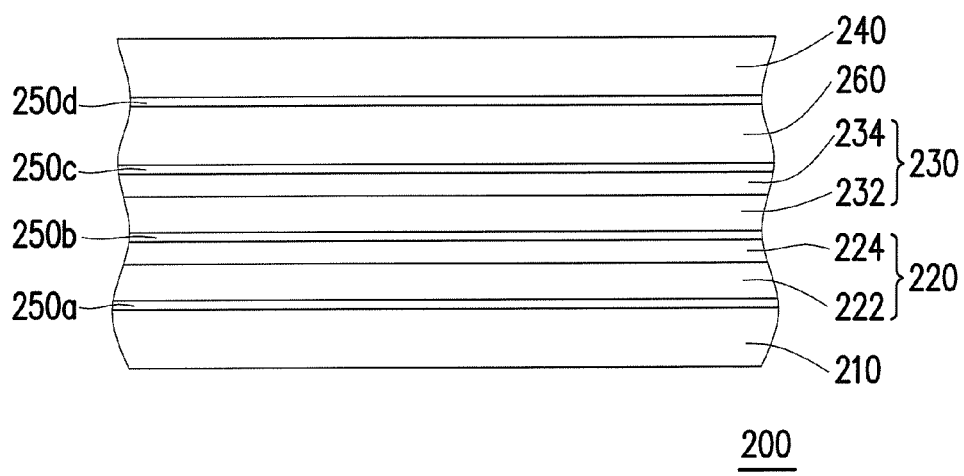
FIG. 9 is a schematic partial side view of a touch projection screen according to another embodiment of the invention.

FIG. 9 is a schematic partial side view of the touch projection screen according to another embodiment of the invention. In the touch projection screen 200 of FIG. 9, configuration of a first substrate 210, a first adhesive layer 250a, first touch layers 220, a first base layer 222, a first patterned electrode 224, a second adhesive layer 250b, second touch layers 230, a second base layer 232, a second pattered electrode 234, a third adhesive layer 250c, and a reflective projection film 240 is similar to the configuration of the first substrate 110, the first adhesive layer 150a, the first touch layers 120, the first base layer 122, the first patterned electrode 124, the second adhesive layer 150b, the second touch layers 130, the second base layer 132, the second pattered electrode 134, the third adhesive layer 150c, and the reflective projection film 140 of FIG. 4, and detail thereof is not repeated.

A difference between the touch projection screen 200 and the touch projection screen 100 is that the touch projection screen 200 further includes a second substrate 260 and a fourth adhesive layer 250d. The second substrate 260 could be a flexible structure, and a material of the second substrate 260 is, for example, but not limited to polyethylene terephthalate (PET). The second substrate 260 is disposed between the second touch layers 230 and the reflective projection film 240. The second substrate 260 is adhered to the second touch layers 230 through the third adhesive layer 250c, and the reflective projection film 240 is adhered to the second substrate 260 through the fourth adhesive layer 250d. The fourth adhesive layer 250d may be unnecessary to adopt the expensive optical adhesive, such that the manufacturing cost can be reduced.

The touch projection screen 200 of the embodiment is, for example, a flexible structure, and the user could roll up the touch projection screen 200. By adding the second substrate 260 between the reflective projection film 240 and the second touch layers 230, the first touch layers 220 and the second touch layers 230 can be stably clamped between the first substrate 210 and the second substrate 260 to avoid unexpected deformation and displacement of the first touch layers 220 and the second touch layers 230 or a fissure/gap generated between each of the substrates and the touch layers when the touch projection screen 200 is rolled up, so as to improve structural stability of the touch projection screen 200 when the touch projection screen 200 is rolled up.

Figure 10:
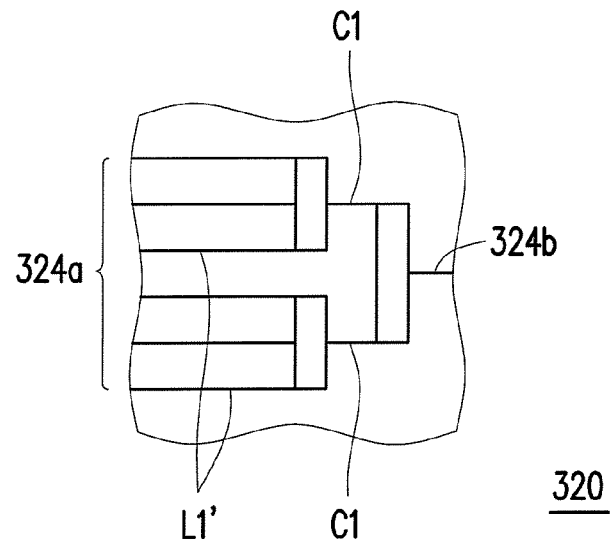
FIG. 10 and FIG. 11 are schematic partial top views of a first touch layer and a second touch layer according to another embodiment of the invention.
Figure 11:
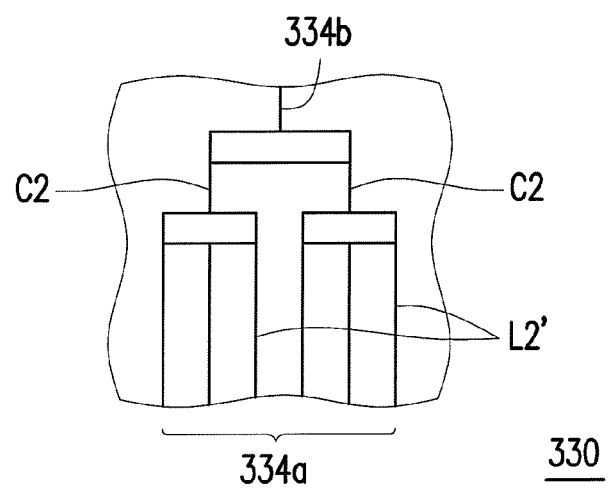

FIG. 10 and FIG. 11 are schematic partial top views of a first touch layer 320 and a second touch layer 330 according to another embodiment of the invention. The first touch layer 320 shown in FIG. 10 and the second touch layer 330 shown in FIG. 11 are similar to the first touch layer 120 shown in FIG. 6 and the second touch layer 130 shown in FIG. 7, and a difference therebetween is that each of the first electrode line groups 324a includes at least two first sub collection lines C1, a part of the first electrode lines L1' are collected to one of the first sub collection lines C1, another part of the first electrode lines L1' are collected to the other one of the first sub collection lines C1, and the first sub collection lines C1 are collected to the first collection line 324b. Similarly, each of the second electrode line groups 334a includes at least two second sub collection lines C2, a part of the second electrode lines L2' are collected to one of the second sub collection lines C2, another part of the second electrode lines L2' are collected to the other one of the second sub collection lines C2, and the second sub collection lines C2 are collected to the second collection line 334b. In this way, according to a design requirement (for example, a size of the touch projection screen or a size of an edge routing area of the touch projection screen), each of the first touch layers 320 can be cut to divide each of the first electrode line groups 324a into two electrode line groups with a smaller pitch that respectively correspond to the two first sub collection lines C1, and each of the second touch layers 330 can be cut to divide each of the second electrode line groups 334a into two electrode line groups with a smaller pitch that respectively correspond to the two second sub collection lines C2.

Figure 12:
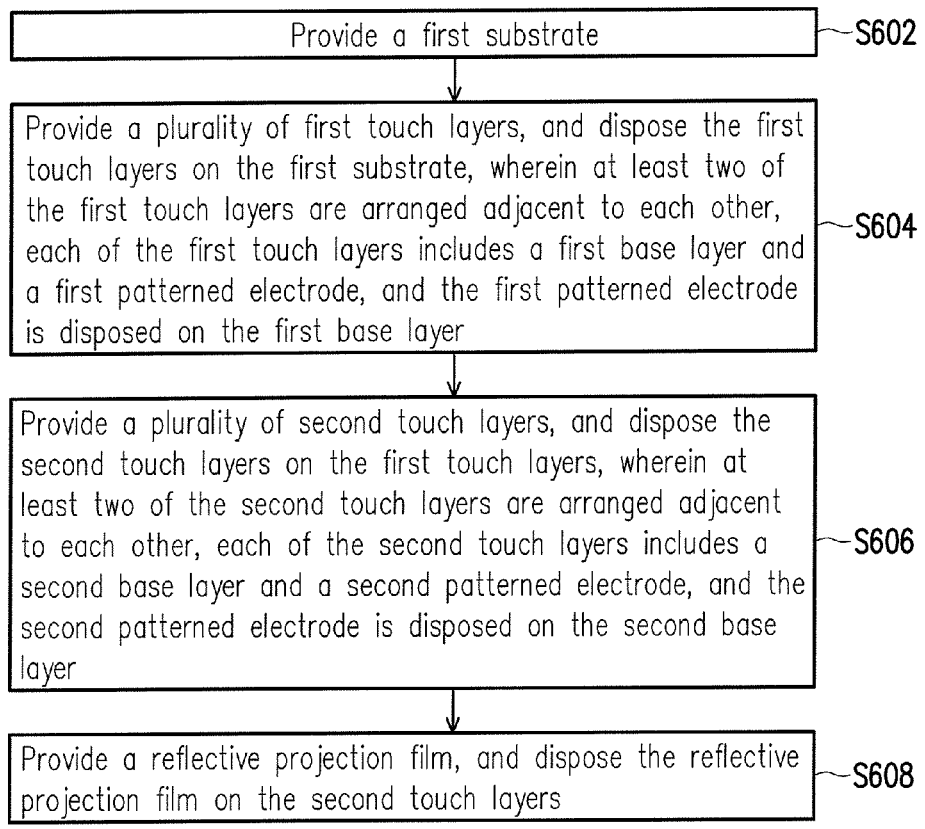
FIG. 12 is a flowchart illustrating a manufacturing method of the touch projection screen of FIG. 1.

A manufacturing method of the touch projection screen of the invention is described below with reference of the touch projection screen of FIG. 1 to FIG. 3. FIG. 12 is a flowchart illustrating a manufacturing method of the touch projection screen of FIG. 1. Referring to FIG. 12, first, the first substrate 110 is provided (step S602). Then, a plurality of the first touch layers 120 are provided, where the first touch layers 120 are disposed on the first substrate 110 and at least two of the first touch layers 120 are arranged adjacent to each other, and each of the first touch layers 120 includes the first base layer 122 and the first patterned electrode 124, where the first patterned electrode 124 is disposed on the first base layer 122 (step S604). A plurality of the second touch layers 130 are provided, where the second touch layers 130 are disposed on the first touch layers 120 and at least two of the second touch layers 130 are arranged adjacent to each other, each of the second touch layers 130 includes the second base layer 132 and the second patterned electrode 134, and the second patterned electrode 134 is disposed on the second base layer 132 (step S606). Finally, the reflective projection film 140 is provided, where the reflective projection film 140 is disposed on the second touch layers 130 (step S608).

The embodiments of the invention have at least one of the following advantages. In the embodiments of the invention, a plurality of first touch layers are arranged adjacent to each other, a plurality of second touch layers are arranged adjacent to each other, and the second touch layers are disposed on the first touch layers to construct a touch sensing layer with a larger size, so as to fit a large-size touch operation interface (for example, the touch projection screen). Because the touch layers of the invention can be applied to the touch projection screen other than being applied to a touch display panel of an electronic device, the touch layers may be unnecessary to have a high light transmittance, and manufacturing difficulty thereof can be decreased. In addition, each of the first electrode lines of the first patterned electrode and each of the second electrode lines of the second patterned electrode are linear structures other than planar structures, such that time required for an etching process of the electrodes may not be excessively increased, and a usage amount of the conductive material can be decreased to save the manufacturing cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art after reading the disclosure. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch projection screen, comprising:
a first substrate;
a plurality of first touch layers, disposed on the first substrate, wherein at least two of the first touch layers are arranged adjacent to each other, each of the first touch layers comprises a first base layer and a first patterned electrode, and the first patterned electrode is disposed on the first base layer;
a plurality of second touch layers, disposed on the first touch layers, wherein at least two of the second touch layers are arranged adjacent to each other, each of the second touch layers comprises a second base layer and a second patterned electrode, and the second patterned electrode is disposed on the second base layer; and
a reflective projection film, disposed on the second touch layers, wherein the reflective projection film covers all of the second base layers and the second patterned electrodes of the plurality of second touch layers.

2. The touch projection screen as claimed in claim 1, wherein each of the first touch layers is partially overlapped with one of the second touch layers, and is partially overlapped with another one of the second touch layers.

3. The touch projection screen as claimed in claim 1, wherein each of the second touch layers is partially overlapped with one of the first touch layers, and is partially overlapped with another one of the first touch layers.

4. The touch projection screen as claimed in claim 1, further comprising a first adhesive layer, a second adhesive layer, and a third adhesive layer, wherein the first touch layers are adhered to the first substrate through the first adhesive layer, the second touch layers are adhered to the first touch layers through the second adhesive layer, and the reflective projection film is adhered to the second touch layers through the third adhesive layer.

5. The touch projection screen as claimed in claim 1, further comprising a second substrate, wherein the second substrate is disposed between the second touch layers and the reflective projection film.

6. The touch projection screen as claimed in claim 5, further comprising a first adhesive layer, a second adhesive layer, a third adhesive layer, and a fourth adhesive layer, wherein the first touch layers are adhered to the first substrate through the first adhesive layer, the second touch layers are adhered to the first touch layers through the second adhesive layer, the second substrate is adhered to the second touch layers through the third adhesive layer, and the reflective projection film is adhered to the second substrate through the fourth adhesive layer.

7. The touch projection screen as claimed in claim 1, wherein the touch projection screen is a flexible structure.

8. The touch projection screen as claimed in claim 1, wherein the second base layer is located between at least one first patterned electrode and at least one second patterned electrode.

9. The touch projection screen as claimed in claim 1, wherein each of the first patterned electrodes comprises a plurality of first electrode line groups and a plurality of first collection lines, the first electrode line groups are arranged in intervals and arranged in parallel, and are respectively connected to a control unit through the first collection lines.

10. The touch projection screen as claimed in claim 9, wherein each of the first electrode line groups comprises a plurality of first electrode lines, and the first electrode lines are arranged in intervals and arranged in parallel and are connected to the corresponding first collection line.

11. The touch projection screen as claimed in claim 10, wherein each of the first electrode line groups comprises at least two first sub collection lines, a part of the first electrode lines are connected to one of the first sub collection lines, another part of the first electrode lines are connected to another one of the first sub collection lines, and the at least two first sub collection lines are connected to the first collection line.

12. The touch projection screen as claimed in claim 1, wherein each of the second patterned electrodes comprises a plurality of second electrode line groups and a plurality of second collection lines, the second electrode line groups are arranged in intervals and arranged in parallel, and are respectively connected to a control unit through the second collection lines.

13. The touch projection screen as claimed in claim 12, wherein each of the second electrode line groups comprises a plurality of second electrode lines, and the second electrode lines arranged in intervals and arranged in parallel and are connected to the corresponding second collection line.

14. The touch projection screen as claimed in claim 13, wherein each of the second electrode line groups comprises at least two second sub collection lines, a part of the second electrode lines are connected to one of the second sub collection lines, another part of the second electrode lines are connected to another one of the second sub collection lines, and the at least two second sub collection lines are connected to the second collection line.

15. The touch projection screen as claimed in claim 1, wherein each of the first patterned electrodes comprises a plurality of first electrode line groups, each of the second patterned electrodes comprises a plurality of second electrode line groups, and an extending direction of each of the first electrode line groups is perpendicular to an extending direction of each of the second electrode line groups.

16. The touch projection screen as claimed in claim 1, wherein areas of at least two first touch layers are different to each other.

17. The touch projection screen as claimed in claim 1, wherein areas of at least two second touch layers are different to each other.

18. The touch projection screen as claimed in claim 1, wherein an area of at least one of the first touch layers is different to an area of at least one of the second touch layers.

19. The touch projection screen as claimed in claim 1, wherein each of the first base layers has a plurality of first alignment points, each of the second base layers has a plurality of second alignment points, at least a part of the second alignment points on each of the second base layers are aligned to at least a part of the first alignment points on at least one of the first base layers.

20. The touch projection screen as claimed in claim 1, further comprising an outer frame, wherein the outer frame encircles the first substrate, the first touch layers, the second touch layers, and the reflective projection film.

21. A projection system, comprising:
a touch projection screen, comprising:
a first substrate;
a plurality of first touch layers, disposed on the first substrate, wherein at least two of the first touch layers are arranged adjacent to each other, each of the first touch layers comprises a first base layer and a first patterned electrode, and the first patterned electrode is disposed on the first base layer;
a plurality of second touch layers, disposed on the first touch layers, wherein at least two of the second touch layers are arranged adjacent to each other, each of the second touch layers comprises a second base layer and a second patterned electrode, and the second patterned electrode is disposed on the second base layer; and
a reflective projection film, disposed on the second touch layers, wherein the reflective projection film covers all of the second base layers and the second patterned electrodes of the plurality of second touch layers; and
a projection apparatus, adapted to project an image beam on the touch projection screen, wherein the reflective projection film is configured to reflect the image beam to a viewing area.

* * * * *